(12) United States Patent
Zhang et al.

(10) Patent No.: US 9,706,421 B2
(45) Date of Patent: Jul. 11, 2017

(54) APPARATUS AND METHOD FOR SIRE BIAS COMPENSATION

(71) Applicant: QUALCOMM Incorporated, San Diego, CA (US)

(72) Inventors: Wei Zhang, Santa Clara, CA (US); Sharif Ahsanul Matin, San Diego, CA (US); Feng Lu, Sunnyvale, CA (US); Krishna Chaitanya Mukkera, San Diego, CA (US); Praveen Peruru, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 261 days.

(21) Appl. No.: 14/288,291

(22) Filed: May 27, 2014

(65) Prior Publication Data

US 2015/0163686 A1    Jun. 11, 2015

Related U.S. Application Data

(60) Provisional application No. 61/913,010, filed on Dec. 6, 2013.

(51) Int. Cl.
| | |
|---|---|
| *H04W 24/08* | (2009.01) |
| *H04B 17/336* | (2015.01) |
| *H04W 52/24* | (2009.01) |
| *H04B 1/7097* | (2011.01) |

(52) U.S. Cl.
CPC .......... *H04W 24/08* (2013.01); *H04B 17/336* (2015.01); *H04W 52/241* (2013.01); *H04B 1/7097* (2013.01)

(58) Field of Classification Search
None
See application file for complete search history.

(56) References Cited

U.S. PATENT DOCUMENTS

| | | | |
|---|---|---|---|
| 7,027,496 B2* | 4/2006 | Tapaninen | H04B 1/707 375/147 |
| 2004/0131108 A1* | 7/2004 | Kyosti | H04B 17/336 375/148 |
| 2004/0264604 A1* | 12/2004 | Malette | H04B 1/7103 375/340 |
| 2005/0075122 A1* | 4/2005 | Lindoff | H04W 52/367 455/522 |

(Continued)

FOREIGN PATENT DOCUMENTS

| | | |
|---|---|---|
| WO | WO-9943101 | 8/1999 |
| WO | WO-0165717 A1 | 9/2001 |

OTHER PUBLICATIONS

International Search Report and Written Opinion—PCT/US2014/068934—ISA/EPO—Feb. 17, 2015.

*Primary Examiner* — Yaotang Wang
(74) *Attorney, Agent, or Firm* — Ashish L. Patel

(57) ABSTRACT

Aspects of the disclosure are directed to estimating a signal to interference ratio. A signal energy estimate corresponding to a received data transmission is generated. A noise to interference ratio estimate corresponding to the received data transmission is generated. A bias, corresponding to the noise to interference ratio estimate, is subtracted from the signal energy estimate. A signal to interference ratio estimate is determined corresponding to the signal energy estimate less the bias, and the noise to interference ratio estimate.

30 Claims, 9 Drawing Sheets

(56) References Cited

U.S. PATENT DOCUMENTS

| | | | |
|---|---|---|---|
| 2005/0143117 A1* | 6/2005 | Jalloul | H04B 17/336 |
| | | | 455/522 |
| 2005/0281358 A1* | 12/2005 | Bottomley | H04B 1/712 |
| | | | 375/343 |
| 2007/0287382 A1* | 12/2007 | Catreux-Erceg | H04W 52/241 |
| | | | 455/63.1 |
| 2013/0153298 A1* | 6/2013 | Pietraski | H04L 5/001 |
| | | | 175/45 |
| 2013/0287066 A1 | 10/2013 | Wallen | |
| 2013/0295979 A1 | 11/2013 | Shin et al. | |
| 2013/0324179 A1 | 12/2013 | Zhang et al. | |
| 2014/0003388 A1 | 1/2014 | Tidestav | |
| 2014/0010267 A1 | 1/2014 | Jacob et al. | |

* cited by examiner

APPARATUS AND METHOD FOR SIRE BIAS COMPENSATION

CROSS-REFERENCE TO RELATED APPLICATION(S)

This application claims the benefit of U.S. Provisional Application No. 61/913,010, filed Dec. 6, 2013, the entire contents of which are incorporated herein by reference.

TECHNICAL FIELD

Aspects of the present disclosure relate generally to wireless communication systems, and more particularly, to an apparatus and method for generating a signal-to-interference ratio estimate (SIRE) in W-CDMA networks.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (WCDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. High Speed Downlink Packet Access (HSDPA) is a data service offered on the downlink of WCDMA networks.

In the older generation of W-CDMA networks, such as those described in the 3GPP technical specification 25.221 R99, which was released in 1999 and commonly known as R99, each user has a separate and independent communication path to the network base station (known as Node B) via a Dedicated Physical Channel (DPCH). As W-CDMA technology evolved, new physical channels were added to improve system operation and to accommodate ever increasing number of users. For example, in HSPA networks, a Fractional-DPCH (F-DPCH) was added to optimize the consumption of downlink channelization codes among multiples users. Current generation UEs (User Equipment) must support communications on both R99 DPCH and F-DPCH. However, due to many differences between communication protocols on these channels, certain optimizations of various channel parameters at the UE are desirable. Thus, as the demand for mobile broadband access continues to increase, research and development continue to advance the UMTS technologies not only to meet the growing demand for mobile broadband access, but to advance and enhance the user experience with mobile communications.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In various aspects, the disclosure provides for an apparatus and method for determining a signal-to-interference ratio estimate (SIRE) that is conducive to improved estimates, especially in high-noise or low-signal-energy environments, compared to a conventional SIRE. Some aspects provide for the removal of a noise component, which can bias the numerator, or signal energy estimate, portion of the SIRE, prior to calculating the ratio of signal energy to interference to generate the SIRE. In this way, problem scenarios, wherein a very low SIRE should have triggered a radio link failure, but the bias prevents this trigger, can be reduced or avoided.

In one example a method of estimating a signal to interference ratio is disclosed. The method includes generating a signal energy estimate corresponding to a received data transmission, generating a noise to interference ratio estimate corresponding to the received data transmission, subtracting a bias, corresponding to the noise to interference ratio estimate, from the signal energy estimate, and determining a signal to interference ratio estimate corresponding to the signal energy estimate less the bias, and the noise to interference ratio estimate.

In another example a user equipment (UE) configured for wireless communication is disclosed. The UE includes means for generating a signal energy estimate corresponding to a received data transmission, means for generating a noise to interference ratio estimate corresponding to the received data transmission, means for subtracting a bias, corresponding to the noise to interference ratio estimate, from the signal energy estimate, and means for determining a signal to interference ratio estimate corresponding to the signal energy estimate less the bias, and the noise to interference ratio estimate.

In another example a UE configured for wireless communication is disclosed. The UE includes at least one processor, a memory communicatively coupled to the at least one processor, and a wireless communication interface communicatively coupled to the at least one processor. Further, the at least one processor is configured to generate a signal energy estimate corresponding to a received data transmission, to generate a noise to interference ratio estimate corresponding to the received data transmission, to subtract a bias, corresponding to the noise to interference ratio estimate, from the signal energy estimate, and to determine a signal to interference ratio estimate corresponding to the signal energy estimate less the bias, and the noise to interference ratio estimate.

In another example a non-transitory computer-readable medium operable on a UE configured for wireless communication is disclosed. The computer-readable medium includes instructions for causing a computer to generate a signal energy estimate corresponding to a received data transmission, instructions for causing a computer to generate a noise to interference ratio estimate corresponding to the received data transmission, instructions for causing a computer to subtract a bias, corresponding to the noise to interference ratio estimate, from the signal energy estimate, and instructions for causing a computer to determine a signal to interference ratio estimate corresponding to the signal energy estimate less the bias, and the noise to interference ratio estimate.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

One or more aspects of the present disclosure enable a better signal-to-interference ratio (SIR) estimate. A better SIRE can be needed because conventional SIREs may be unable to fall to a low enough value to trigger a radio link failure (RLF), even though the RLF should in fact have been triggered.

This problem scenario basically occurs because the numerator of the SIR, which should only include the signal, can also include some of the noise. Because this noise factor, or "bias," adds to the estimated signal, the resulting SIRE is higher than expected.

Therefore, in an aspect of the present disclosure, an SIR estimator enables the separation of the signal and the noise (bias), and therefore, the noise or bias can be subtracted out of the numerator. In this way, the SIRE is more accurate, and can fall sufficiently low to allow the RLF to occur.

Figure 1:
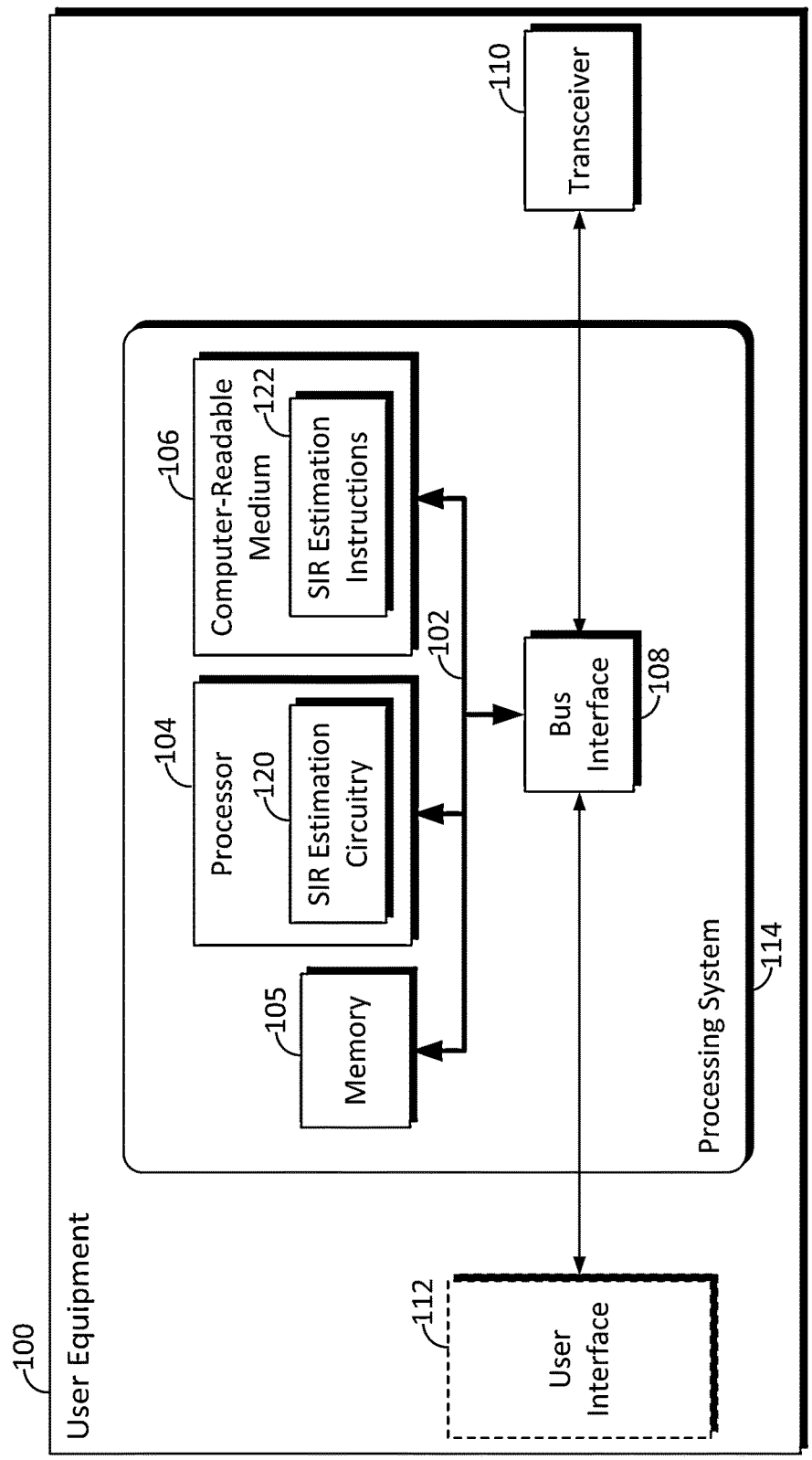
FIG. 1 is a block diagram illustrating an example of a hardware implementation for an apparatus employing a processing system.

FIG. 1 is a conceptual diagram illustrating an example of a hardware implementation for an apparatus 100 employing a processing system 114. In accordance with various aspects of the disclosure, an element, or any portion of an element, or any combination of elements may be implemented with a processing system 114 that includes one or more processors 104. For example, the apparatus 100 may be a user equipment (UE) as illustrated in any one or more of FIGS. 2, 3, and/or 5. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 104, as utilized in an apparatus 100, may be used to implement any one or more of the processes described below and illustrated in FIGS. 8 and/or 9.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described below for any particular apparatus. The computer-readable medium 106 may also be used for storing data that is manipulated by the processor 104 when executing software.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 2:
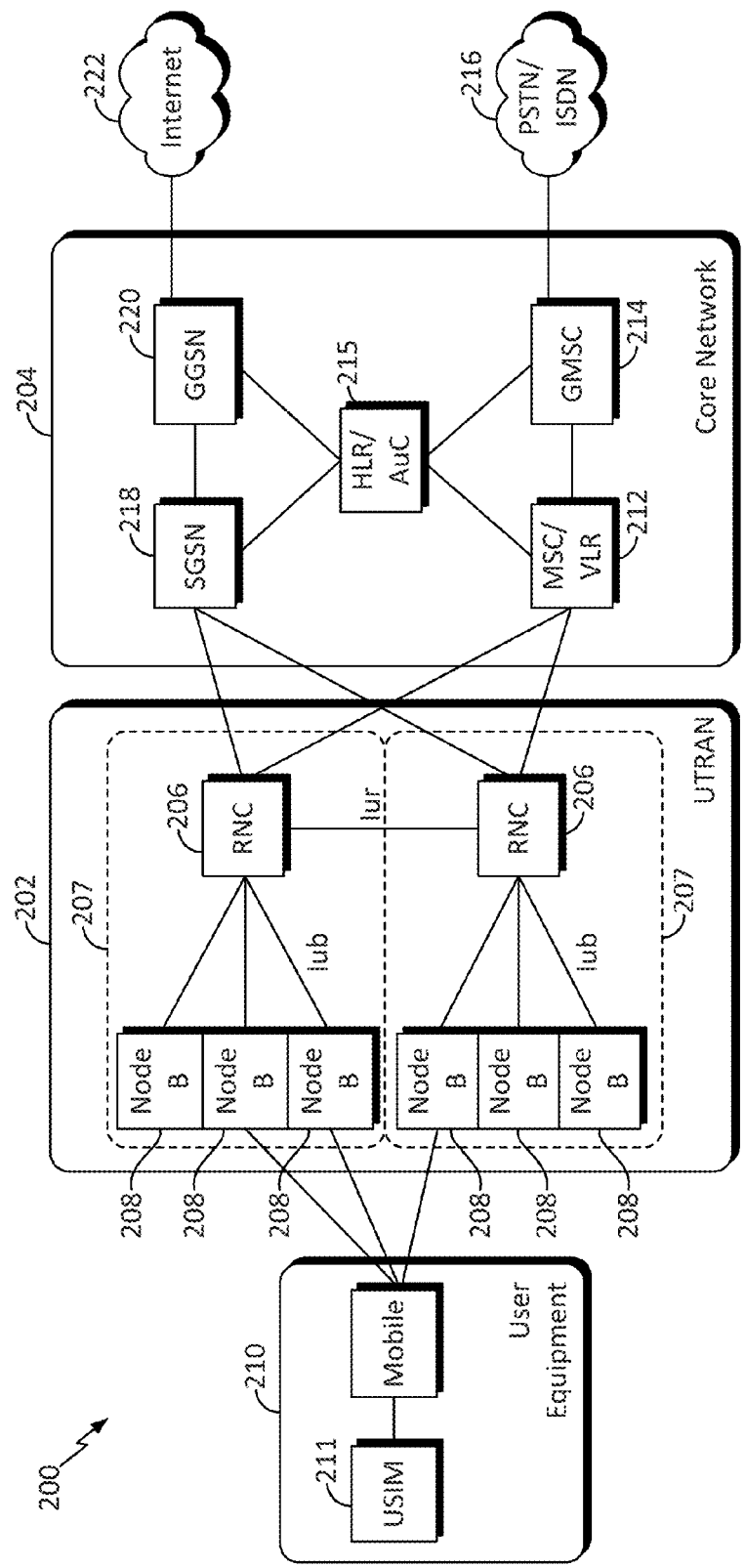
FIG. 2 is a block diagram conceptually illustrating an example of a telecommunications system.

The various concepts presented throughout this disclosure may be implemented across a broad variety of telecommunication systems, network architectures, and communication standards. Referring now to FIG. 2, as an illustrative example without limitation, various aspects of the present disclosure are illustrated with reference to a Universal Mobile Telecommunications System (UMTS) system 200. A UMTS network includes three interacting domains: a core network 204, a radio access network (RAN) (e.g., the UMTS Terrestrial Radio Access Network (UTRAN) 202), and a user equipment (UE) 210. Among several options available for a UTRAN 202, in this example, the illustrated UTRAN 202 may employ a W-CDMA air interface for enabling various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring, and releasing radio resources within the RNS 207. The RNC 206 may be interconnected to other RNCs (not shown) in the UTRAN 202 through various types of interfaces such as a direct physical connection, a virtual network, or the like using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network 204 for any number of mobile apparatuses.

Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210 and the uplink (UL), also called the reverse link, refers to the communication link from a UE 210 to a Node B 208.

The core network 204 can interface with one or more access networks, such as the UTRAN 202. As shown, the core network 204 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-switched data services with a serving GPRS support node (SGSN) 218 and a gateway GPRS support node (GGSN) 220. General Packet Radio Service (GPRS) is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

Figure 3:
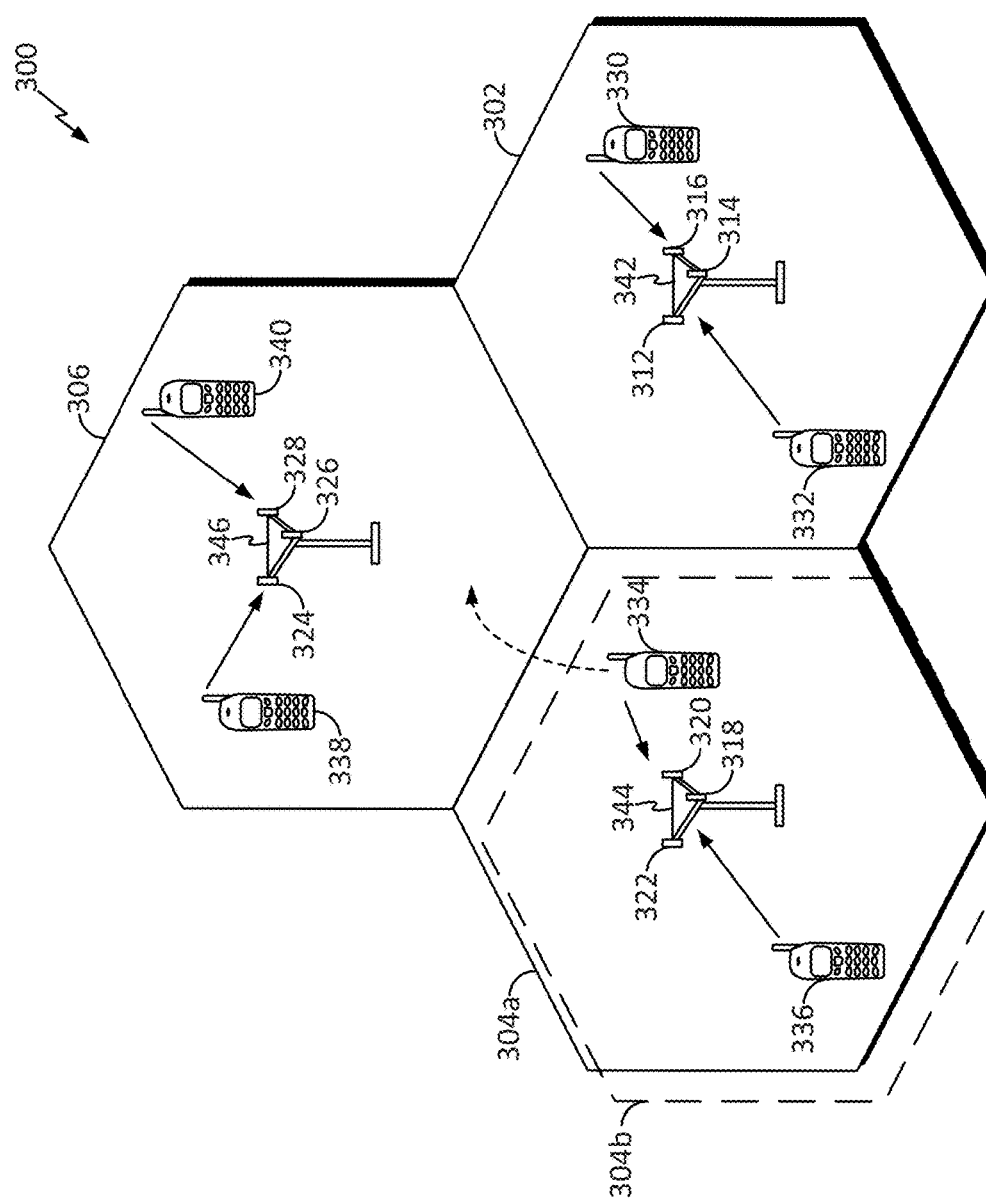
FIG. 3 is a conceptual diagram illustrating an example of an access network.

The UTRAN 202 is one example of a RAN that may be utilized in accordance with the present disclosure. Referring to FIG. 3, by way of example and without limitation, a simplified schematic illustration of a RAN 300 in a UTRAN architecture is illustrated. The system includes multiple cellular regions (cells), including cells 302, 304, and 306, each of which may include one or more sectors. Cells may be defined geographically (e.g., by coverage area) and/or may be defined in accordance with a frequency, scrambling code, etc. That is, the illustrated geographically-defined cells 302, 304, and 306 may each be further divided into a plurality of cells, e.g., by utilizing different scrambling codes. For example, cell 304a may utilize a first scrambling code, and cell 304b, while in the same geographic region and served by the same Node B 344, may be distinguished by utilizing a second scrambling code.

In a cell that is divided into sectors, the multiple sectors within a cell can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 may each correspond to a different sector. In cell 306, antenna groups 324, 326, and 328 may each correspond to a different sector.

The cells 302, 304, and 306 may include several UEs that may be in communication with one or more sectors of each cell 302, 304, or 306. For example, UEs 330 and 332 may be in communication with Node B 342, UEs 334 and 336 may be in communication with Node B 344, and UEs 338 and 340 may be in communication with Node B 346. Here, each Node B 342, 344, and 346 may be configured to provide an access point to a core network 204 (see FIG. 2) for all the UEs 330, 332, 334, 336, 338, and 340 in the respective cells 302, 304, and 306.

During a call with a source cell, or at any other time, the UE 336 may monitor various parameters of the source cell as well as various parameters of neighboring cells. Further, depending on the quality of these parameters, the UE 336 may maintain communication with one or more of the neighboring cells. During this time, the UE 336 may maintain an Active Set, that is, a list of cells to which the UE 336 is simultaneously connected (i.e., the UTRAN cells that are currently assigning a downlink dedicated physical channel DPCH or fractional downlink dedicated physical channel F-DPCH to the UE 336 may constitute the Active Set).

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 202 is based on such DS-CDMA technology and additionally calls for a frequency division duplexing (FDD). FDD uses a different carrier frequency for the uplink (UL) and downlink (DL) between a Node B 208 and a UE 210.

Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

A high speed packet access (HSPA) air interface includes a series of enhancements to the 3G/W-CDMA air interface between the UE 210 and the UTRAN 202, facilitating greater throughput and reduced latency for users. Among other modifications over prior standards, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink or EUL).

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 210 and the core network 204 (referring to FIG. 2), and may include circuit switched and packet switched protocols. The AS provides the lower layers, for signaling between the UTRAN 202 and the UE 210, and may include a user plane and a control plane. Here, the user plane or data plane carries user traffic, while the control plane carries control information (i.e., signaling).

Figure 4:
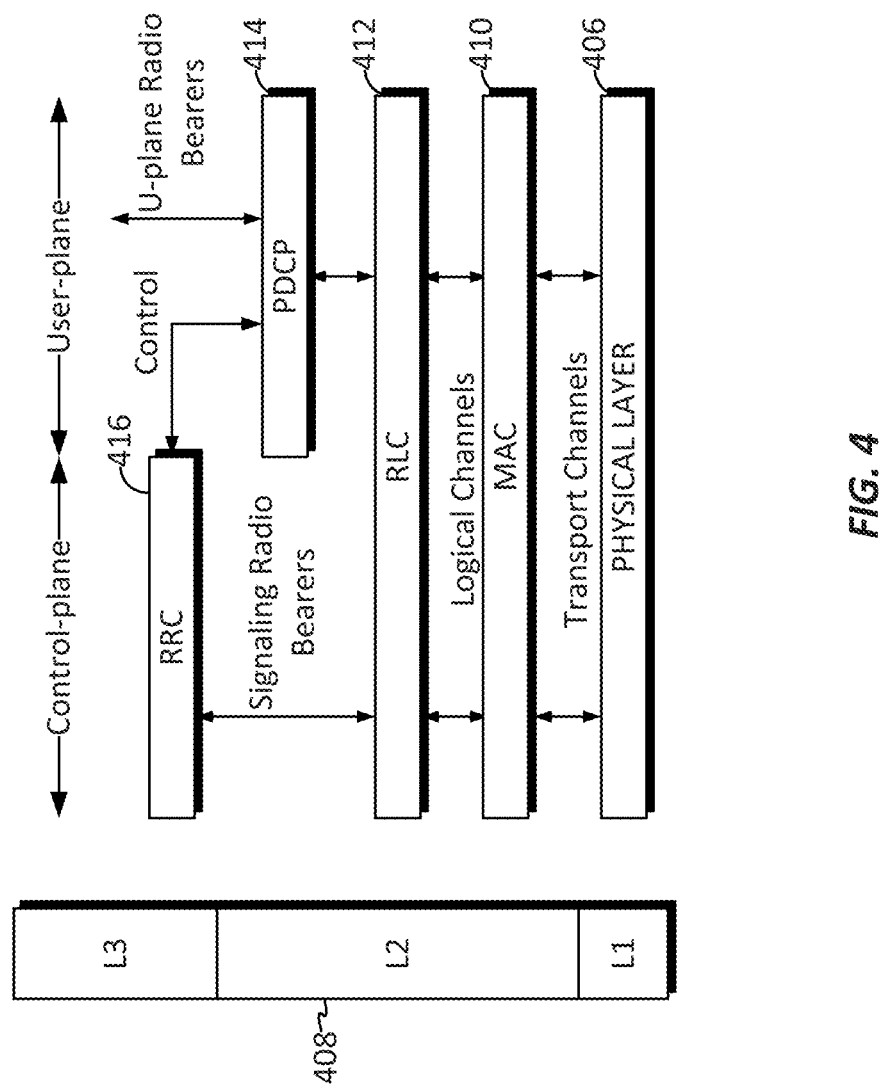
FIG. 4 is a conceptual diagram illustrating an example of a radio protocol architecture for the user and control plane.

Turning to FIG. 4, the AS is shown with three layers: Layer 1, Layer 2, and Layer 3. Layer 1 is the lowest layer and implements various physical layer signal processing functions. Layer 1 will be referred to herein as the physical layer 406. The data link layer, called Layer 2 408, is above the physical layer 406 and is responsible for the link between the UE 210 and Node B 208 over the physical layer 406.

At Layer 3, the RRC layer 416 handles the control plane signaling between the UE 210 and the Node B 208. RRC layer 416 includes a number of functional entities for routing higher layer messages, handling broadcasting and paging functions, establishing and configuring radio bearers, etc. Among these functional entities, the RRC layer at an RNC includes functionality to establishing and releasing an RRC connection with each UE that has a connection with that RNC.

In the illustrated air interface, the L2 layer 408 is split into sublayers. In the control plane, the L2 layer 408 includes two sublayers: a medium access control (MAC) sublayer 410 and a radio link control (RLC) sublayer 412. In the user plane, the L2 layer 408 additionally includes a packet data convergence protocol (PDCP) sublayer 414. Although not shown, the UE may have several upper layers above the L2 layer 408 including a network layer (e.g., IP layer) that is terminated at a PDN gateway on the network side and an application layer that is terminated at the other end of the connection (e.g., far end UE, server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between Node Bs.

The RLC sublayer 412 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations.

Figure 5:
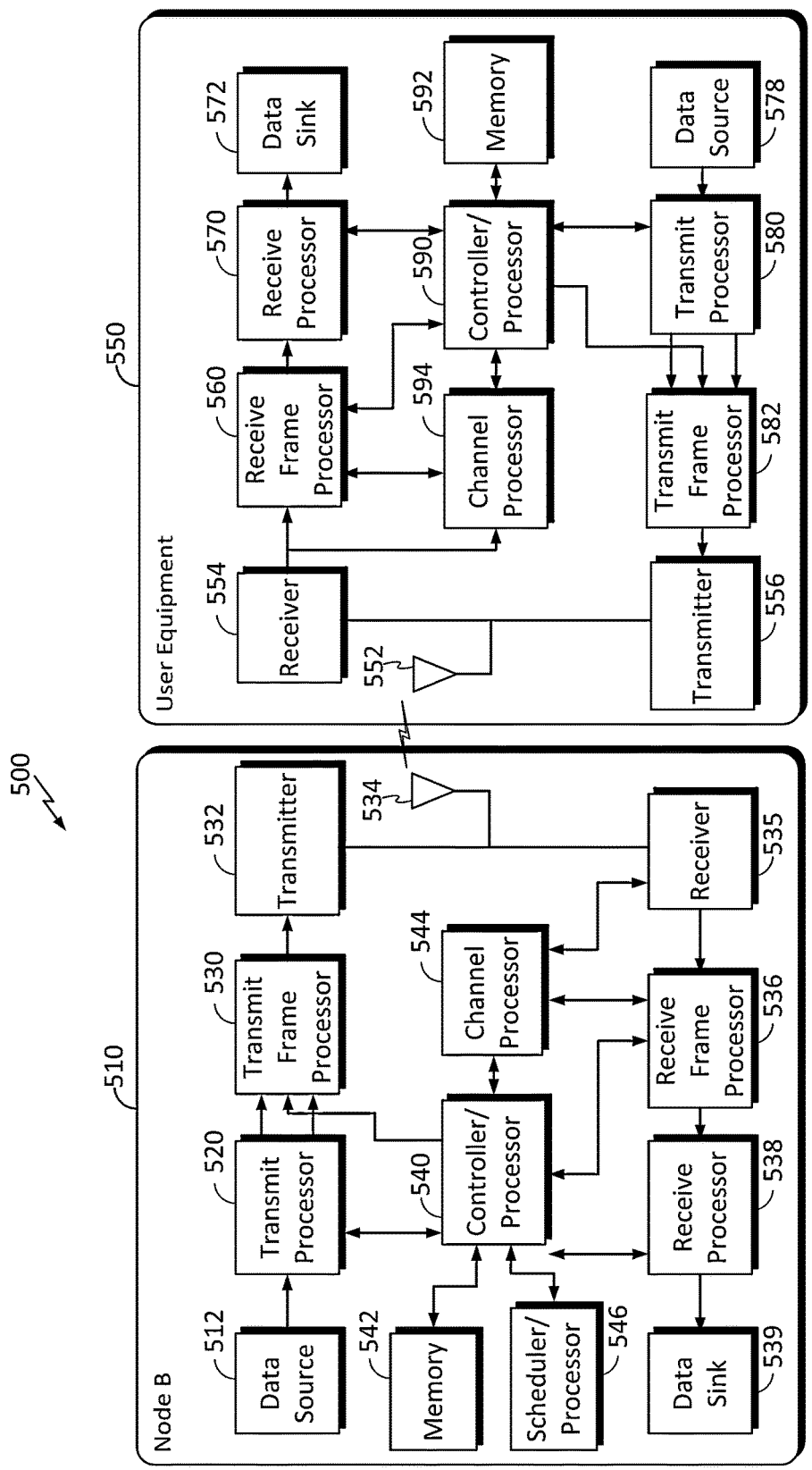
FIG. 5 is a block diagram conceptually illustrating an example of a Node B in communication with a UE in a telecommunications system.

FIG. 5 is a block diagram of an exemplary Node B 510 in communication with an exemplary UE 550, where the Node B 510 may be the Node B 208 in FIG. 2, and the UE 550 may be the UE 210 in FIG. 2 and/or the UE 100 in FIG. 1. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/ processor 546 at the Node B 510 may be used to allocate resources to the UEs and schedule downlink and/or uplink transmissions for the UEs.

As discussed above, when an RRC connection is established between a UE 550 and the network (e.g., a network entity such as the RNC 206), the RRC connection can be released, including the connection of all radio bearers and all signaling radio bearers, by way of the network transmitting to the UE 550 an RRC Connection Release message. Here, when the network transmits the RRC Connection Release message (e.g., carried on the downlink dedicated control channel DCCH or the downlink common control channel CCCH), it is intended that the UE 550, upon receiving the message, may have any ongoing procedures interrupted, and may perform an RRC connection release procedure, which generally includes the release of all radio resources and transmission of a response message called RRC Connection Release Complete.

However, due to one or more issues with the radio connection, the RRC Connection Release message may not be sent from the network, or in another example, the UE 550 may miss an RRC Connection Release message that the network did send.

As a result, the UE 550 may continue to monitor the downlink, e.g., listening for the F-DPCH, even though the network has probably shut down the radio connection with that UE 550 and ceased transmission of the corresponding F-DPCH. Thus, it is up to the UE itself to determine whether it is in sync or out of sync, which leads to a decision of whether to trigger a radio link failure (RLF) condition to drop the call.

In this case, the UE 550 relies on its own generation of an SIR estimate (SIRE) of the F-DPCH transmissions from the network, and according to this estimate, the UE 550 determines whether to report that it is out-of-sync, and after a suitable amount of time, to report a RLF. In some examples, the UE 550 may rely on the channel processor 594 for the computation of the SIRE. In other examples, the receiver 554 may include an SIR estimator. In one example, with reference to FIG. 1, a UE 100 may include SIR estimation circuitry 120 and/or SIR estimation instructions 122 to facilitate estimation of the SIR.

When the network ceases to transmit the F-DPCH, it is generally expected that the UE's SIR estimate of the F-DPCH would drop, resulting in the declaration of the RLF. However, in some circumstances, even though the transmission of the F-DPCH for that UE 550 has been terminated at the network, the F-DPCH SIRE generated at the UE 550 may not drop low enough to trigger the RLF. That is, there may be a given threshold for the F-DPCH SIRE, below which the UE 550 declares the out-of-sync condition, and thus, the RLF. However, if the SIRE does not fall below this SIRE threshold, the UE 550 may remain in this state for an extended period of time (e.g., up to a minute or more) prior to declaring the RLF.

For example, as described in further detail below, due to a certain bias in the SIR estimation, an SIRE may remain at a level around −5 dB, which may be too great for the UE 550 to claim to be out-of-sync when the SIRE threshold for declaring this condition is set to a lower value such as −6.5 dB.

Upon investigation, in accordance with an aspect of the present disclosure, it has been determined this delay prior to declaration of the RLF may be due to the signal-to-interference-ratio estimate (SIRE) of the F-DPCH hanging above the SIRE threshold. As a result, the UE 550 does not claim an out-of-sync status, and thus, no RLF is declared after the F-DPCH is shut down by the network.

While the present disclosure describes in detail an SIRE based on the F-DPCH, aspects of the disclosure are not limited only to such an SIR estimate of this channel. Rather, aspects of the disclosure may be applied to generate an SIRE based on any suitable channel where the UE does not know what data is transmitted by the network onto that channel.

When generating the SIRE based on the F-DPCH, the SIRE is calculated based on a filtered absolute value of an uplink transmit power control bit (raw ULTPC). This is different from an SIRE based on the DPCH, which is based on the filtered version of a depatterned dedicated pilot (DP) in the DPCH. The depatterned DP generally includes pilots with some fixed pattern based on a slot format, and includes the use of a known pilot pattern to correlate with a received DPCH signal and evaluate the power of DPCH.

By virtue of the use of the ULTPC bit, for the F-DPCH SIRE, the filtered absolute ULTPC value includes an amount of noise variance in the final filtered value. That is, the value of the ULTPC bit is unknown, and can be a positive value (corresponding to a 0 ULTPC bit) or a negative value (corresponding to a 1 ULTPC bit). Thus, the SIRE takes the absolute value of the received TPC bit, and uses an IR filter to reduce the noise, and then takes a square of this value to obtain the energy estimate.

According to a mathematical derivation, the current SIR estimate based on the F-DPCH is very close to maximum likelihood estimate in good (low noise) signal conditions. However, in poor RF conditions, the SIR estimate may be poor. That is, compared to an SIRE based on the DPCH, in very noisy scenarios, the SIR estimate based on the F-DPCH resulting from the conventional algorithm can be high, because of the noisy estimation of the signal quality using the absolute value of the ULTPC.

Given the model of a received signal y:

$$y = u\text{ULTPC} + \delta N$$

where u represents the channel, ULTPC represents the actual TPC bit transmitted by the Node B to the UE on the DL DPCH, δ represents the noise variance, and N represents a normalized noise function with 0 mean and unit variance. Defining the SNR ρ as:

$$\rho = \frac{u^2}{\delta^2}$$

the SIRE expression based on the F-DPCH may be represented as:

$$SIRE = \frac{[u + f(\rho)]\delta^2}{A \frac{Ep}{Io} \frac{Nt}{Io}}$$

In the above SIRE expression, Nt/Io represents the noise or noise power over the interference or interference power, or an estimate thereof. Ep/Io represents a pilot energy or power over the interference or interference power. "A" is a constant, which in one example may represent a value that may be used in conjunction with fixed point processing.

Also, in the above SIRE expression, f(ρ) may be expressed as:

$$2\left(\frac{1}{\sqrt{2\pi}}e^{-\frac{\rho}{2}} - Q(\sqrt{\rho})\sqrt{\rho}\right),$$

where Q(x) is the tail probability of the standard normal distribution.

Thus, the SIRE will converge as the SNR goes to 0. This clearly indicates the root cause of the SIRE bias described above. That is, while the numerator of the SIRE should in theory entirely correspond to the signal energy (i.e., the channel u and the received ULTPC bit), it can be seen that the numerator of the SIRE in fact includes a factor based on the noise variance δ. Thus, even though the network has ceased to transmit the F-DPCH, the continued existence of the noise on the channel can lead to an unexpectedly high SIRE, which may result in an SIRE that is too high to trigger an out-of-service (OOS) condition and/or the RLF condition.

As shown above, the SIRE based on the mean of the absolute value of the TPC is complicated in terms of expression, and thus, it is difficult to cancel the bias from the SIRE. In an aspect of the present disclosure, however, the energy of the ULTPC may be filtered, making the bias compensation easier.

That is, in an aspect of the present disclosure, by estimating the signal energy separately from estimating the noise energy, the noise estimate can accordingly be subtracted from the signal estimate. In this way, a more accurate signal energy estimate may be obtained, resulting in an improved SIRE.

That is, given the model above, the mean of the ULTPC energy may be expressed as the expected value of y squared:

$$E(y^2) + u^2 + \delta^2 = B\frac{Ep}{Io}\frac{Ec}{Io} + C\frac{Ep}{Io}\frac{Nt}{Io}$$

In the above expression, Ec/Io represents the ratio of received power of a carrier to noise or interference power. The values "B" and "C" are constants, which in one example may be representative of the use of fixed point processing in accordance with aspects of the disclosure.

It is straightforward to cancel the noise part from the ULTPC energy based on the above expression (e.g., by subtracting the $\delta^2$ part out of the equation). Therefore, noise compensation may be performed in the final SIRE, e.g., when the channel conditions are bad. In fact, in some examples, after compensation, the linear mean of SIRE may be quite close to the theoretical SIR value over a large range.

Figure 6:
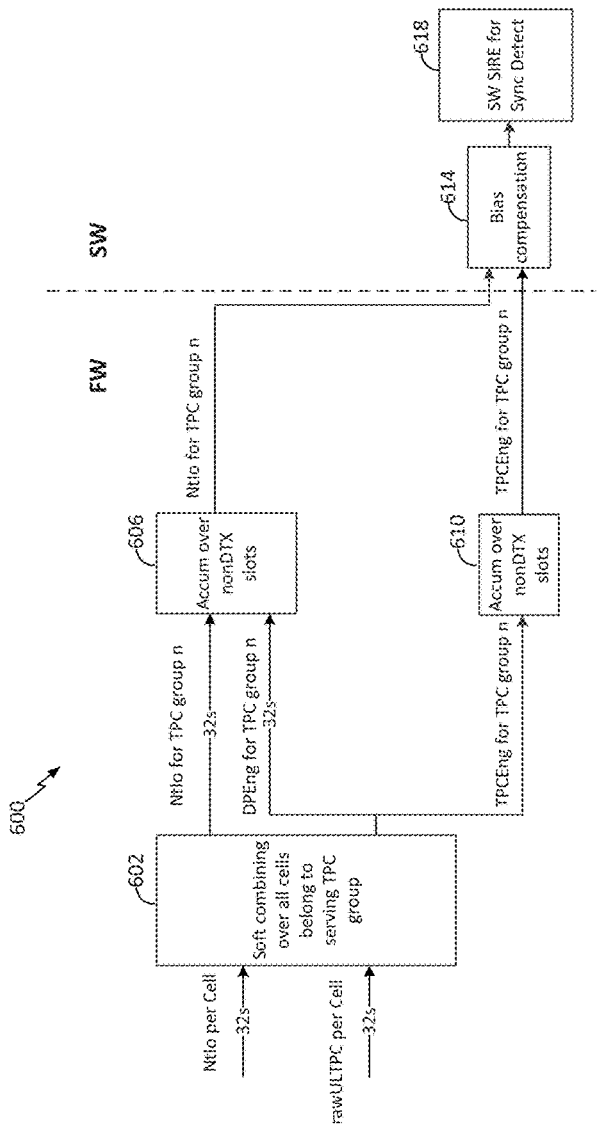
FIG. 6 is a block diagram conceptually illustrating portions of an SIRE determination circuit according to one example.

FIG. 6 is a block diagram illustrating portions of an exemplary SIR estimator 600 configured according to one or more aspects of the present disclosure. As illustrated, the SIR estimator 600 may be the same as or similar to the SIR estimation circuitry 120 (see FIG. 1), and/or may have the same or similar functionality as the SIR estimation instructions 122 (see FIG. 1).

As seen in the illustration, a vertical dashed line separates firmware blocks (FW) from software blocks (SW). That is, as one non-limiting example, the functional blocks to the left of the dashed line may be implemented in firmware, while the functional blocks to the right of the dashed line may be implemented in software. Of course, those skilled in the art will comprehend that this is mere one implementation example, and within the scope of the present disclosure, any portion or portions of the SIR estimator 600 may be implemented in hardware, firmware, and/or software.

As seen in this illustration, there are two relevant estimates in firmware: the Nt/Io (the noise over the interference) for the TPC group, as well as the TPC energy for that TPC group. These are used for the bias compensation block 614 on the bottom right. This block takes the Nt/Io and the TPC energy estimate and calculates the bias, and then determines the SIR estimation for sync detection 618. In this way, a bias due to noise may be removed from the signal estimate, resulting in an improved SIRE.

On the left, an Nt/Io signal for each cell may be inputted from hardware, as well as a raw ULTPC for each cell. (Here, the raw ULTPC value may take a positive/negative value, whereas the TPC energy corresponds to a square of these raw values.) These signals may then be soft combined 602 over all of the cells that belong to a serving TPC group and provided to firmware. Here, a TPC group refers to group of cells that provide a radio link to the UE and for which the UE monitors transmit power control transmissions.

After soft combining, two outputs are generated: an Nt/Io for each TPC group, and the raw ULTPC for each TPC group. The DP energy (the dedicated pilot energy, i.e., the numerator in the SIRE equation above) and the TPC energy are both based on these values.

These values are accumulated over non-DTX slots 606 and 610 as illustrated. That is, in case of CPC DTX/DRX, not all slots in a frame are active. Thus, the F-DPCH values are only accumulated over non-DTX slots, which includes the active slots only.

The bias compensation block 614 takes two inputs: the Nt/Io for the TPC group, and the TPC energy for that TPC group, each of which are accumulated over a suitable number of non-DTX slots 606 and 610. Thus, as described above, the bias compensation block 614 enables subtraction of the bias (noise part) from the ULTPC energy, and accordingly, the SIRE for sync detection 618 can be more in line with the theoretical SIR over a large range of noise conditions.

Figure 7:
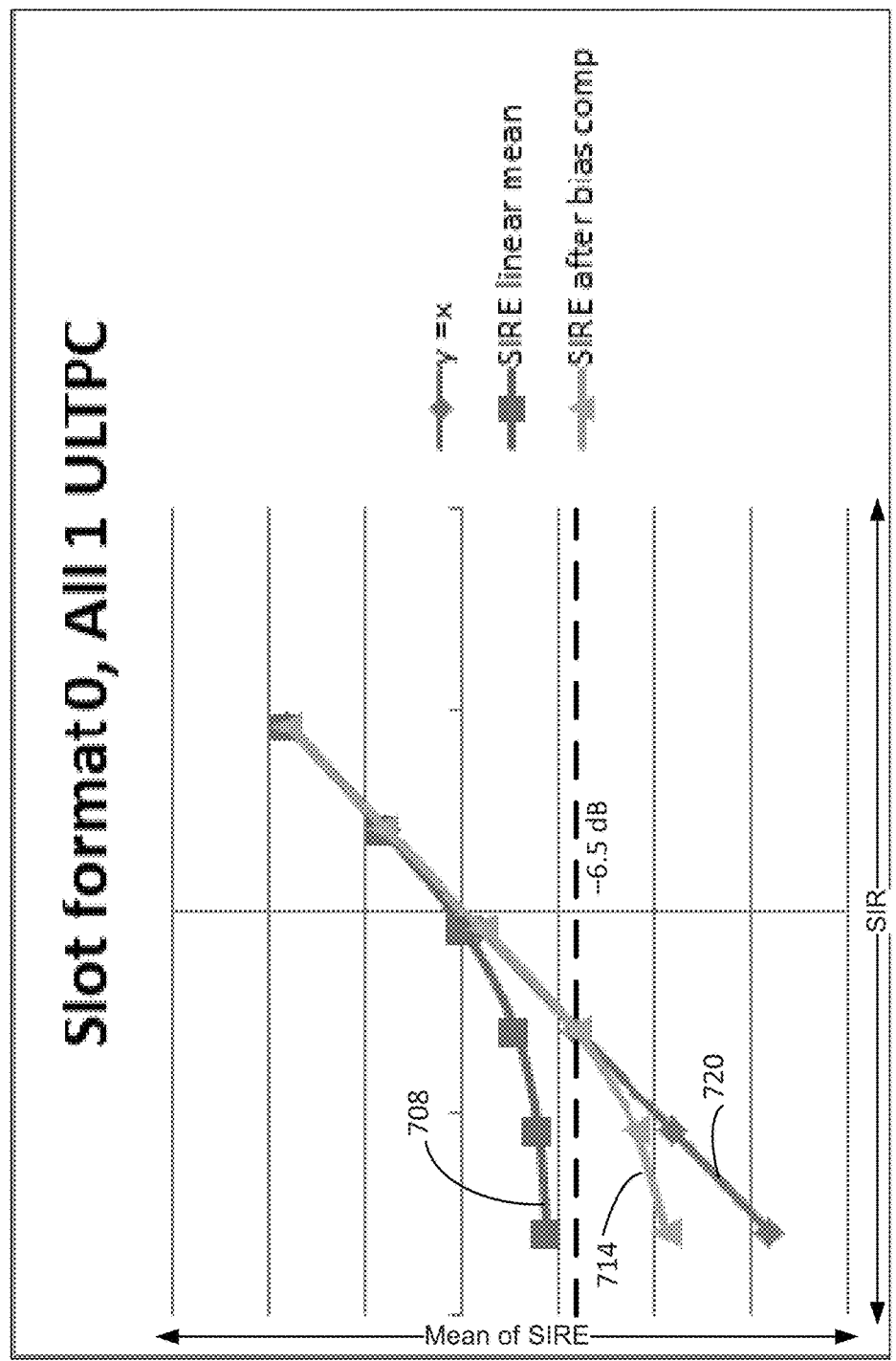
FIG. 7 is a chart illustrating an improved SIRE as determined by utilizing some aspects of the present disclosure.

FIG. 7 is a chart illustrating an example of the performance of an SIR estimator utilizing the above-described approach in accordance with some aspects of the disclosure. In the illustration, the curve 708 which is denoted via square-shaped symbols or points, shows an SIRE determined utilizing a conventional linear mean. As seen here, as the actual value of the SIR (along the horizontal axis) decreases, the conventional SIRE fails to decrease accordingly, due to the noise factor that appears in the numerator of the SIRE calculation. Thus, if a threshold for declaring a RLF is, for example, −6.5 dB (as illustrated with the dashed line), it is possible that the conventional SIRE would never reach this value, causing a delay or failure to declare the RLF.

However, when subtracting the bias or noise factor from the signal estimate, as described above in accordance with some aspects of the present disclosure, as illustrated with the curve 714 which is denoted via triangle-shaped symbols or points, the SIRE more closely follows the actual SIR even in a low-SIR (e.g., high noise) regime. In this way, the SIRE is more capable of falling below a given threshold (e.g., the illustrated −6.5 dB threshold), resulting in faster declaration of a RLF. The curve 720 which is denoted via diamond-shaped symbols or points is provided for reference and demonstrates a linear, one-to-one relationship between the vertical and horizontal axes in FIG. 7.

Figure 8:
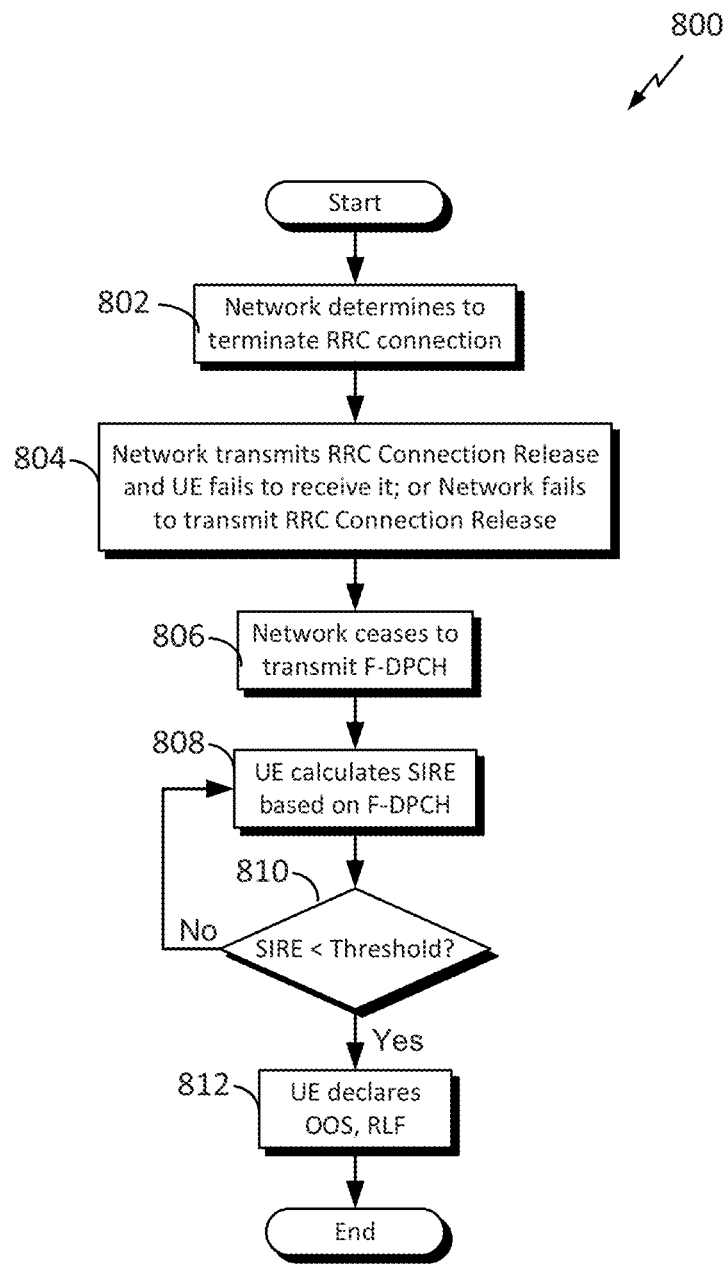
FIG. 8 is a flow chart illustrating an exemplary process for determining a radio link failure (RLF) in accordance with a determined SIRE according to one example.

FIG. 8 is a flow chart illustrating an exemplary process operable at a UE (e.g., the UE 100 illustrated in FIG. 1, the UE 210 illustrated in FIG. 2, and/or the UE 550 illustrated in FIG. 5, a processor 104) and at a network (e.g., the UTRAN 202 illustrated in FIG. 2) for determining an out-of-service (OOS) state, and/or a radio link failure (RLF) in accordance with some aspects of the present disclosure. As illustrated, at block 802, the UTRAN 202 may determine to terminate an RRC connection with the UE 100; accordingly, at block 804, the UTRAN 202 may attempt to transmit an RRC Connection Release message to the UE 100. Here, due to one or more of many various issues, the UTRAN 202 may fail to transmit the RRC Connection Release message; or, in another example, the UTRAN 202 may transmit the RRC Connection Release message, but the UE 100 may fail to receive it. In any case, at block 806, the UTRAN 202 may terminate the RRC connection and accordingly cease to transmit the F-DPCH.

At block 808, the UE 100 may determine an SIRE (e.g., utilizing the SIRE determination circuitry as described above and illustrated in FIG. 6) and determine in block 810 whether this SIRE is less than a suitable threshold. If the SIRE is not less than the threshold (e.g., the "No" path out of block 810 is taken), then the process may return to block 808. Here, if the UE 100 is not capable of generating an SIRE less than the threshold, as may be the case with conventional UEs in noisy environments, as described above, this loop may continue indefinitely, resulting in a delay in the declaration of a RLF.

On the other hand, if the SIRE is less than the threshold (e.g., for a suitably long measurement interval) as reflected via the "Yes" path out of block 810, then the process may proceed to block 812, wherein the UE 100 may declare an out-of-sync condition, and/or a radio link failure.

Figure 9:
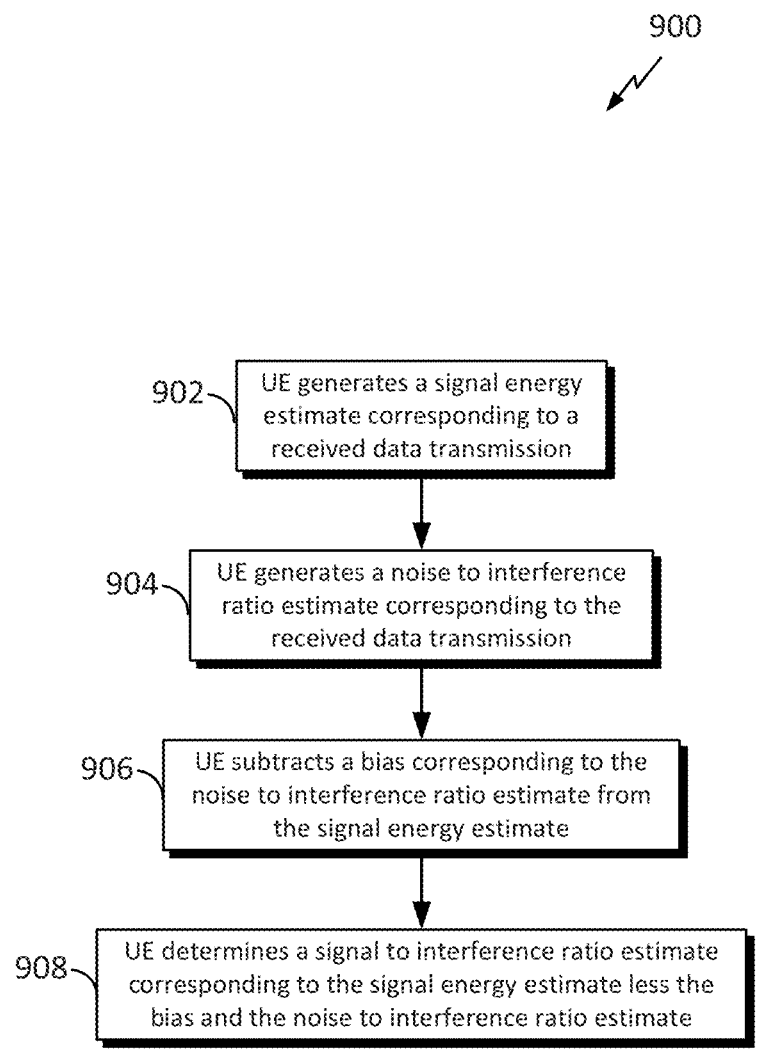
FIG. 9 is a flow chart of an exemplary method for determining a SIRE.

FIG. 9 is a flow chart illustrating an exemplary process 900 for generating an SIRE in accordance with one or more aspects of the present disclosure. In various examples, the process 900 may be operable at the UE 100 illustrated in FIG. 1, the UE 210 illustrated in FIG. 2, and/or the UE 550 illustrated in FIG. 5. In other examples, the process 900 may be operable at a processor 104, or at any other suitable means for carrying out the below described functions. At block 902, the UE 100 may generate a signal energy estimate (e.g., TPCEng for a particular TPC group) corresponding to a received data transmission (e.g., a TPC command on the F-DPCH). At block 904, the UE 100 may generate a noise to interference ratio estimate (Nt/Io for that TPC group) corresponding to the received data transmission (e.g., the TPC commands on the F-DPCH). At block 906, the UE 100 may subtract a bias, corresponding to the noise to interference ratio estimate (e.g., the noise portion) from the signal energy estimate generated at block 902. Finally, at block 908, the UE 100 may determine the SIRE corresponding to the signal energy estimate less the bias (as determined at block 906) and the noise to interference ratio estimate (as determined at block 904).

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 8 and 9 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-3, 5, and/or 6 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of estimating a signal to interference ratio, comprising:
   receiving a data transmission at a user equipment (UE);
   generating a signal energy estimate for a transmit power control (TPC) group comprising a plurality of cells, by calculating an expected value of a square of the received data transmission;
   generating a noise to interference ratio estimate for the TPC group, corresponding to the received data transmission;
   subtracting a bias, corresponding to the noise to interference ratio estimate, from the signal energy estimate; and
   determining a signal to interference ratio estimate corresponding to the signal energy estimate less the bias, and the noise to interference ratio estimate.

2. The method of claim 1, wherein the received data transmission comprises transmit power control (TPC) data carried on a fractional dedicated physical channel (F-DPCH).

3. The method of claim 1, wherein the expected value comprises:

$$E(y^2)=u^2+\delta^2, \text{ wherein}$$

y=uULTPC+δN, and wherein
u represents a channel through which the received data transmission traveled;
ULTPC represents a transmit power control (TPC) bit;
δ represents a noise variance on the received data transmission; and
N represents a normalized noise function.

4. The method of claim 3, further comprising:
combining the noise to interference ratio estimate for each of the plurality of cells with a raw ULTPC value for each of the cells, the cells forming a group and providing a radio link; and
generating, based on the combination, a noise to interference ratio estimate for the group, a dedicated pilot energy for the group, and a transmit power control (TPC) energy estimate for the group,
wherein the determined signal to interference ratio estimate is based on the generated noise to interference ratio estimate for the group, the dedicated pilot energy for the group, and the transmit power control (TPC) energy estimate for the group.

5. The method of claim 4, wherein the generated noise to interference ratio estimate for the group, the dedicated pilot energy for the group, and the transmit power control (TPC) energy estimate for the group are accumulated over active slots only.

6. The method of claim 1, further comprising determining the signal to interference ratio estimate in the absence of receipt of a connection release message by the UE.

7. The method of claim 1, further comprising:
declaring a link failure based on a determination that the signal to interference ratio estimate is less than a threshold.

8. The method of claim 7, wherein the determination that the signal to interference ratio estimate is less than the threshold is based on a measurement interval of a predetermined length.

9. A user equipment (UE) configured for wireless communication, comprising:
   means for receiving a data transmission;
   means for generating a signal energy estimate for a transmit power control (TPC) group comprising a plurality of cells, by calculating an expected value of a square of the received data transmission;
   means for generating a noise to interference ratio estimate for the TPC group, corresponding to the received data transmission;
   means for subtracting a bias, corresponding to the noise to interference ratio estimate, from the signal energy estimate; and
   means for determining a signal to interference ratio estimate corresponding to the signal energy estimate less the bias, and the noise to interference ratio estimate.

10. The UE of claim 9, wherein the received data transmission comprises transmit power control (TPC) data carried on a fractional dedicated physical channel (F-DPCH).

11. The UE of claim 9, wherein the expected value comprises:

$$E(y^2)=u^2+\delta^2, \text{ wherein}$$

y=uULTPC+δN, and wherein
u represents a channel through which the received data transmission traveled;
ULTPC represents a transmit power control (TPC) bit;
δ represents a noise variance on the received data transmission; and
N represents a normalized noise function.

12. The UE of claim 11, further comprising:
means for combining the noise to interference ratio estimate for each of the plurality of cells with a raw ULTPC value for each of the cells, the cells forming a group and providing a radio link; and
means for generating, based on the combination, a noise to interference ratio estimate for the group, a dedicated pilot energy for the group, and a transmit power control (TPC) energy estimate for the group,
wherein the determined signal to interference ratio estimate is based on the generated noise to interference ratio estimate for the group, the dedicated pilot energy for the group, and the transmit power control (TPC) energy estimate for the group.

13. The UE of claim 12, further comprising:
means for accumulating the generated noise to interference ratio estimate for the group, the dedicated pilot energy for the group, and the transmit power control (TPC) energy estimate for the group over active slots only.

14. The UE of claim 9, wherein the means for determining the signal to interference ratio estimate is configured to determine the signal to interference ratio estimate in the absence of receipt of a connection release message by the UE.

15. The UE of claim 9, further comprising:
means for declaring a link failure based on a determination that the signal to interference ratio estimate is less than a threshold.

16. The UE of claim 15, wherein the determination that the signal to interference ratio estimate is less than the threshold is based on a measurement interval of a predetermined length.

17. A user equipment (UE) configured for wireless communication, comprising:
    at least one processor;
    a memory communicatively coupled to the at least one processor; and
    a wireless communication interface communicatively coupled to the at least one processor,
    wherein the at least one processor is configured to:
        receive a data transmission utilizing the wireless communication interface;
        generate a signal energy estimate for a transmit power control (TPC) group comprising a plurality of cells, by calculating an expected value of a square of the received data transmission;
        generate a noise to interference ratio estimate for the TPC group, corresponding to the received data transmission;
        subtract a bias, corresponding to the noise to interference ratio estimate, from the signal energy estimate; and
        determine a signal to interference ratio estimate corresponding to the signal energy estimate less the bias, and the noise to interference ratio estimate.

18. The UE of claim 17, wherein the received data transmission comprises transmit power control (TPC) data carried on a fractional dedicated physical channel (F-DPCH).

19. The UE of claim 17, wherein the expected value comprises, as:

$$E(y^2)=u^2+\delta^2, \text{ wherein}$$

y=uULTPC+δN, and wherein
u represents a channel through which the received data transmission traveled;
ULTPC represents a transmit power control (TPC) bit;
δ represents a noise variance on the received data transmission; and
N represents a normalized noise function.

20. The UE of claim 19, wherein the at least one processor is further configured to:
    combine the noise to interference ratio estimate for each of the plurality of cells with a raw ULTPC value for each of the cells, the cells forming a group and providing a radio link; and
    generate, based on the combination, a noise to interference ratio estimate for the group, a dedicated pilot energy for the group, and a transmit power control (TPC) energy estimate for the group,
    wherein the determined signal to interference ratio estimate is based on the generated noise to interference ratio estimate for the group, the dedicated pilot energy for the group, and the transmit power control (TPC) energy estimate for the group.

21. The UE of claim 20, wherein the at least one processor is further configured to:
    accumulate the generated noise to interference ratio estimate for the group, the dedicated pilot energy for the group, and the transmit power control (TPC) energy estimate for the group over active slots only.

22. The UE of claim 17, wherein the at least one processor is further configured to:
    determine the signal to interference ratio estimate in the absence of receipt of a connection release message by the UE.

23. The UE of claim 17, wherein the at least one processor is further configured to:
    declare a link failure based on a determination that the signal to interference ratio estimate is less than a threshold.

24. A non-transitory computer-readable medium storing computer executable code on a user equipment (UE) configured for wireless communication, comprising:
    instructions for causing a computer to receive a data transmission;
    instructions for causing a computer to generate a signal energy estimate for a transmit power control (TPC) group comprising a plurality of cells, by calculating an expected value of a square of the received data transmission;
    instructions for causing a computer to generate a noise to interference ratio estimate for the TPC group, corresponding to the received data transmission;
    instructions for causing a computer to subtract a bias, corresponding to the noise to interference ratio estimate, from the signal energy estimate; and
    instructions for causing a computer to determine a signal to interference ratio estimate corresponding to the signal energy estimate less the bias, and the noise to interference ratio estimate.

25. The non-transitory computer-readable medium of claim 24, wherein the received data transmission comprises transmit power control (TPC) data carried on a fractional dedicated physical channel (F-DPCH).

26. The non-transitory computer-readable medium of claim 24, wherein the expected value comprises:

$$E(y^2)=u^2+\delta^2, \text{ wherein}$$

y=uULTPC+δN, and wherein
u represents a channel through which the received data transmission traveled;
ULTPC represents a transmit power control (TPC) bit;
δ represents a noise variance on the received data transmission; and
N represents a normalized noise function.

27. The non-transitory computer-readable medium of claim 26, further comprising:
    instructions for causing a computer to combine the noise to interference ratio estimate for each of the plurality of cells with a raw ULTPC value for each of the cells, the cells forming a group and providing a radio link; and
    instructions for causing a computer to generate, based on the combination, a noise to interference ratio estimate for the group, a dedicated pilot energy for the group, and a transmit power control (TPC) energy estimate for the group,
    wherein the determined signal to interference ratio estimate is based on the generated noise to interference ratio estimate for the group, the dedicated pilot energy for the group, and the transmit power control (TPC) energy estimate for the group.

28. The non-transitory computer-readable medium of claim 27, further comprising:
    instructions for causing a computer to accumulate the generated noise to interference ratio estimate for the group, the dedicated pilot energy for the group, and the transmit power control (TPC) energy estimate for the group over active slots only.

29. The non-transitory computer-readable medium of claim 24, further comprising:
   instructions for causing a computer to determine the signal to interference ratio estimate in the absence of receipt of a connection release message by the UE.

30. The non-transitory computer-readable medium of claim 24, further comprising:
   instructions for causing a computer to declare a link failure based on a determination that the signal to interference ratio estimate is less than a threshold.

* * * * *